(12) United States Patent
Yair et al.

(10) Patent No.: US 6,512,849 B1
(45) Date of Patent: Jan. 28, 2003

(54) FINDING OBJECTS IN AN IMAGE

(75) Inventors: Eyal Yair, Givat Ella (IL); Yaakov Navon, Ein Vered (IL); Ella Barkan, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/575,570

(22) Filed: May 22, 2000

(51) Int. Cl.$^7$ ................................................. G06K 9/46
(52) U.S. Cl. ...................... 382/202; 382/286; 382/291; 382/101
(58) Field of Search ................................ 382/199, 200, 382/101, 102, 202, 205, 286, 287, 291, 190

(56) References Cited

U.S. PATENT DOCUMENTS

| | | | | |
|---|---|---|---|---|
| 4,550,434 A | * | 10/1985 | Shimada et al. | ............ 382/202 |
| 4,749,879 A | * | 6/1988 | Peterson et al. | ............... 327/79 |
| 4,817,166 A | * | 3/1989 | Gonzalez et al. | ............ 382/291 |
| 4,972,495 A | * | 11/1990 | Blike et al. | ................. 382/199 |
| 5,805,740 A | * | 9/1998 | Takagi et al. | ................ 382/291 |
| 5,923,782 A | * | 7/1999 | Chhabra et al. | ............ 382/202 |
| 6,014,450 A | * | 1/2000 | Heilper et al. | .............. 382/101 |
| 6,175,655 B1 | * | 1/2001 | George, III et al. | ......... 382/257 |

OTHER PUBLICATIONS

Vincent. "Morphological Grayscale Reconstruction in Image Analysis: Applications and Efficient Algorithms." IEEE Transactions on Image Processing, vol. 2, No. 2, pp 176–201, Apr. 1993.*

* cited by examiner

Primary Examiner—Jon Chang
(74) Attorney, Agent, or Firm—Darby & Darby

(57) ABSTRACT

A method for finding a predefined object in an image includes selecting a line belonging to the object, the line having a known stroke width and defining a maximum width and a minimum width that together define a range of widths therebetween that contains the stroke width. A feature in the image is found having a feature width within the range, and the feature is processed to determine whether it is a part of the object.

23 Claims, 7 Drawing Sheets

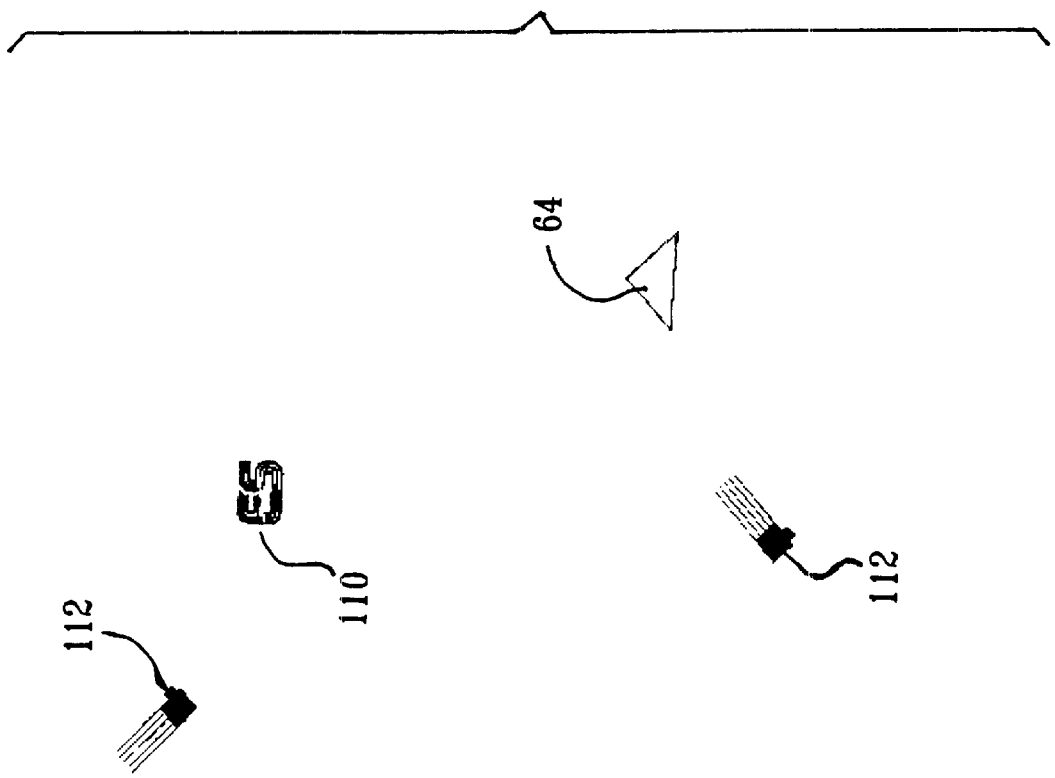

FINDING OBJECTS IN AN IMAGE

FIELD OF THE INVENTION

The present invention relates generally to methods and apparatus for image processing, and specifically to fast methods for finding an object in an image.

BACKGROUND OF THE INVENTION

Many image processing applications involve finding whether a certain object or objects are present in a given image and, if so, at what location in the image. A dictionary is given of the objects to be found. The appearance of the objects in the image, however, may differ from their appearance in the dictionary. Reasons for variation in the appearance of the objects include rotation, scaling, noise, nonlinear distortions, contrast variations within the object and between the object and background, and slight topological variations. Practical image processing methods must be capable of finding the specified objects rapidly, even in the presence of such variations, over large images.

Most methods known in the art for finding objects in an image involve either pattern matching or topological search techniques. Typically, they require that the image first be preprocessed, or filtered, to emphasize desired features, such as gradients or edges. Pattern matching is sensitive to the types of variations mentioned above, particularly nonlinear variations. Topological search methods involve operations such as dilation and finding contours and skeletons, which are too time-consuming and computationally inefficient for rapid processing of large images.

Binarization of the image before searching for objects can decrease computation time, particularly if the image is also decimated. Methods based on binarization, however, are particularly sensitive to contrast variations. Depending on the choice of binarization method and threshold, important features of objects in the image or distinctions between the objects and background may vanish when the image is binarized. Due to brightness and contrast variations within the image, different thresholds are frequently required in different parts of the image.

One particularly challenging object-finding application is automated sorting of postal parcels. The parcel sorting equipment must be capable of recognizing and locating various marks and stickers that are pasted onto the parcels. Typically, only very limited processing time is allocated to scan a large overall image area. Because the images are captured by a camera above the parcel conveyer, there may be large variations in scale due to the different heights of the parcels. Physical distortions of the parcels themselves cause nonlinear distortions of the stickers that are pasted onto them. Furthermore, different editions of the same sticker may have different gray-scale contrasts, stroke widths, fonts and feature topologies.

SUMMARY OF THE INVENTION

It is an object of the present invention to provide methods and apparatus for rapidly finding an object in an image.

It is a further object of some aspects of the present invention to provide methods for finding an object in a image that operate rapidly even on very large images.

It is yet a further object of some aspects of the present invention to provide methods for finding an object in an image that are robust and accurate even in the presence of variations in the appearance of the object.

It is still a further object of some aspects of the present invention to provide a method for finding objects in an image that is suited for use in automated parcel sorting applications.

In preferred embodiments of the present invention, an object of interest to be found in an image is defined in terms of the lines that make up the object, and in particular in terms of the stroke width of the lines. (In the context of the present patent application and in the claims, the term "line" is to be understood as meaning any long, thin feature, whether straight or curved.) When these lines appear in the image, they are expected to have a width within a predefined range. This range contains the known stroke width of the lines that belong to the object, but is expanded to account for any deviations that may occur in the width of the actual lines in the image due to distortion, scaling, contrast variations or other reasons. In order to find the object, the image is rapidly searched for all features having a width within this range. This method generally allows a small set of regions of interest to be located rapidly based on scanning only a small subset of the pixels in the image, with a high probability that the object of interest will be found in one of these regions.

In some preferred embodiments of the present invention, a gray-scale image is searched for the object of interest in a series of successive stages. Each stage narrows the field of search relative to the previous one, while closing in on the specific object being sought. In the first stage, the regions of interest are located by finding clusters of pixels that appear to reside on features having widths within the predefined range. Next, the regions of interest are scanned to find contrast peaks, i.e., sharp variations in gray-scale occurring along selected scan lines taken through the regions. When the magnitude of such a peak is above a given threshold, and its width is within the range, it is a candidate to be a part of one of the lines that make up the object of interest. The candidate peaks are morphologically expanded in a region-growing procedure to create "stains," i.e., connected groups of pixels having approximately the same gray-scale values. Then, a high-level image recognition procedure, as is known in the art, is applied to each of the stains in order to determine which stain or stains correspond to the object of interest. This final stage is the only one that is dependent on the object itself, and it is performed only on the very small subset of all of the pixels that are contained in the stains.

The methods described herein are particularly suited for identifying labels, symbols and stickers on postal parcels, for use in rapid scanning and sorting applications. The principles of the present invention may also be applied, however, in a wide range of other contexts in which objects of interest must be located rapidly in a large image, while avoiding identification errors due to variations and distortions in the image.

There is therefore provided, in accordance with a preferred embodiment of the present invention, a method for finding a predefined object in an image, including:

selecting a line belonging to the object, the line having a known stroke width;

defining a maximum width and a minimum width that together define a range of widths therebetween that contains the stroke width;

finding a feature in the image having a feature width within the range; and processing the feature to determine whether it is a part of the object.

Preferably, defining the maximum and minimum widths includes determining variations that may occur in the width of the line in the object when it appears in the image.

In a preferred embodiment, finding the feature in the image includes:

finding a first locus of pixels in the image belonging to one or more elements of the image having a width less than the maximum width;

finding a second locus of pixels in the image belonging to one or more elements of the image having a width less than the minimum width; and taking a disjunction of the first and second loci.

Preferably, finding the first locus includes finding a pixel having a gray-scale value that differs by at least a predetermined contrast threshold from the gray-scale values of other pixels at a distance therefrom that is equal to the maximum width. Alternatively or additionally, finding the feature in the image includes sub-sampling the image before finding the loci, so that only a subset of all of the pixels in the image are considered for inclusion in the loci. Further alternatively or additionally, finding the feature in the image includes identifying a cluster of the pixels in the disjunction of the first and second loci as a region of interest in the image, which region is a candidate to contain the object.

In a further preferred embodiment, finding the feature in the image includes:

identifying a region of interest in the image, which is a candidate to contain the object;

selecting a scan line passing through the region of interest; and evaluating gray-scale values of pixels disposed along the scan line so as to find a pair of contrast transitions that are separated from one another by a distance that is within the range.

Preferably, selecting the scan line includes selecting a plurality of scan lines, having a spacing therebetween determined responsive to a dimension of the object. Alternatively or additionally, evaluating the gray-scale values includes finding the contrast transitions such that a difference between the respective gray-scale values of a selected pair of the pixels on the scan line, one on either side of any given one of the transitions, exceeds a predetermined threshold. Most preferably, the pair of the pixels are separated from one another by a distance that is selected as a function of the stroke width.

Preferably, processing the feature includes:

finding a locus of at least one initial pixel belonging to the feature; and expanding the locus to reconstruct the line in the object, most preferably by adding to the locus an additional pixel that is adjacent to the at least one initial pixel and has a gray-scale value beyond a threshold that is set responsive to a gray-scale value of the at least one initial pixel.

Preferably, adding the additional pixel to the locus includes adding a first additional pixel, and expanding the locus further includes:

continuing to add further additional pixels that are adjacent to the pixels in the locus and have respective gray-scale values beyond the threshold; and stopping to add the further additional pixels when the locus reaches a maximum size determined responsive to a dimension of the object.

Further preferably, processing the feature includes processing the expanded locus so as to match the locus to the object.

In a preferred embodiment, the object includes one or more markings on an item, according to which the item is to be sorted by a sorting system, and wherein processing the feature includes identifying the markings, and including sorting the item responsive to the identified markings.

There is also provided, in accordance with a preferred embodiment of the present invention, apparatus for finding a predefined object in an image, including an image processor operative to find a feature in the image having a feature width that is within a range between a predefined maximum width and minimum width, the range being defined so that a known stroke width of a line belonging to the object falls within the range, and further operative to process the feature to determine whether it is a part of the object.

Preferably, the apparatus includes an image capture device, configured to capture the image including the object and to convey an electronic representation of the image to the image processor. In a preferred embodiment, the object includes one or more markings on an item, according to which the item is to be sorted, and the apparatus is adapted to read the markings and to sort the item responsive thereto.

There is additionally provided, in accordance with a preferred embodiment of the present invention, a computer software product for finding a predefined object in an image, including a computer-readable medium in which program instructions are stored, which instructions, when read by a computer, cause the computer to find a feature in the image having a feature width that is within a range between a predefined maximum width and minimum width, the range being defined so that a known stroke width of a line belonging to the object falls within the range, and further cause the computer to process the feature to determine whether it is a part of the object.

The present invention will be more fully understood from the following detailed description of the preferred embodiments thereof, taken together with the drawings in which:

BRIEF DESCRIPTION OF THE DRAWINGS

FIG. 8 is a is a reproduction of an image of stains generated by applying the methods of FIGS. 2 and 7 to the image of FIG. 4, in accordance with a preferred embodiment of the present invention.

DETAILED DESCRIPTION OF PREFERRED EMBODIMENTS

Figure 1:
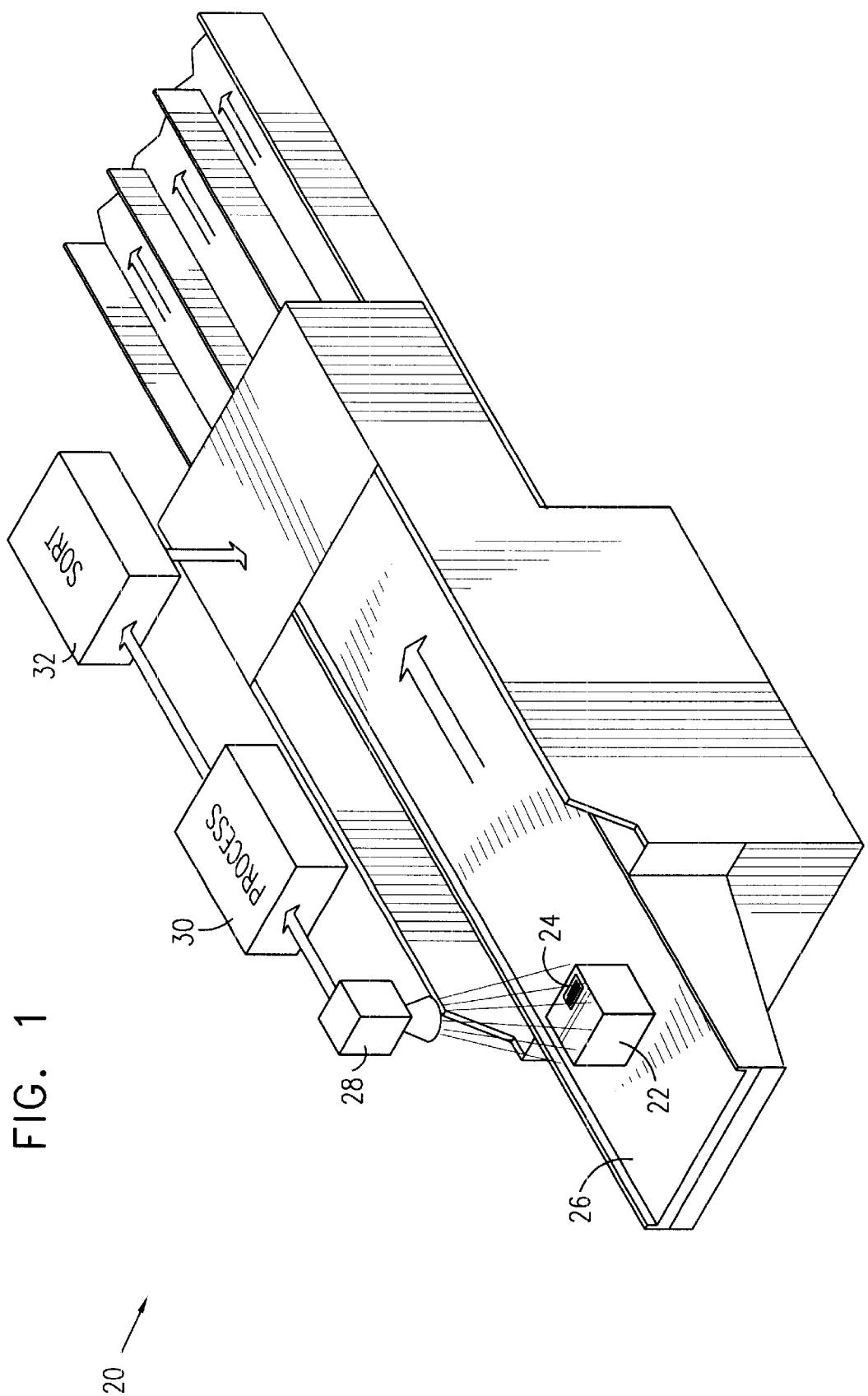
FIG. 1 is a schematic, pictorial illustration of a system for parcel sorting, in accordance with a preferred embodiment of the present invention.

FIG. 1 is a schematic, pictorial illustration of a system 20 for parcel sorting, in accordance with a preferred embodiment of the present invention. A parcel 22, having a label 24 thereon, is transported by a conveyor 26. A gray-scale image of the parcel is captured by a camera 28, preferably a line camera, or alternatively a video or digital still camera. The image captured by the camera is digitized and passed to a processor 30, which applies the methods described hereinbelow to identify label 24 and/or other features on parcel 22. Alternatively, the processor may receive the image from some other source, or it may retrieve the image from a memory (not shown). The identified label is then read automatically by a sorter 32, which routes the parcel accordingly.

Processor 30 preferably comprises a general-purpose computer, programmed with appropriate software to carry out the methods of the present invention. This software may be downloaded to the processor over a network, or alternatively, it may be supplied on tangible media, such as CD-ROM, for installation in the processor. Such software may similarly be adapted for use in other image processing applications, and may thus be supplied to and installed on other computers in like manner. Alternatively, the methods described herein may be implemented using dedicated hardware or a programmable digital signal processor, or using a combination of dedicated and/or programmable elements and/or software. The use of processor 30 in parcel sorting system 20 is described here by way of example, and not limitation.

Figure 2:
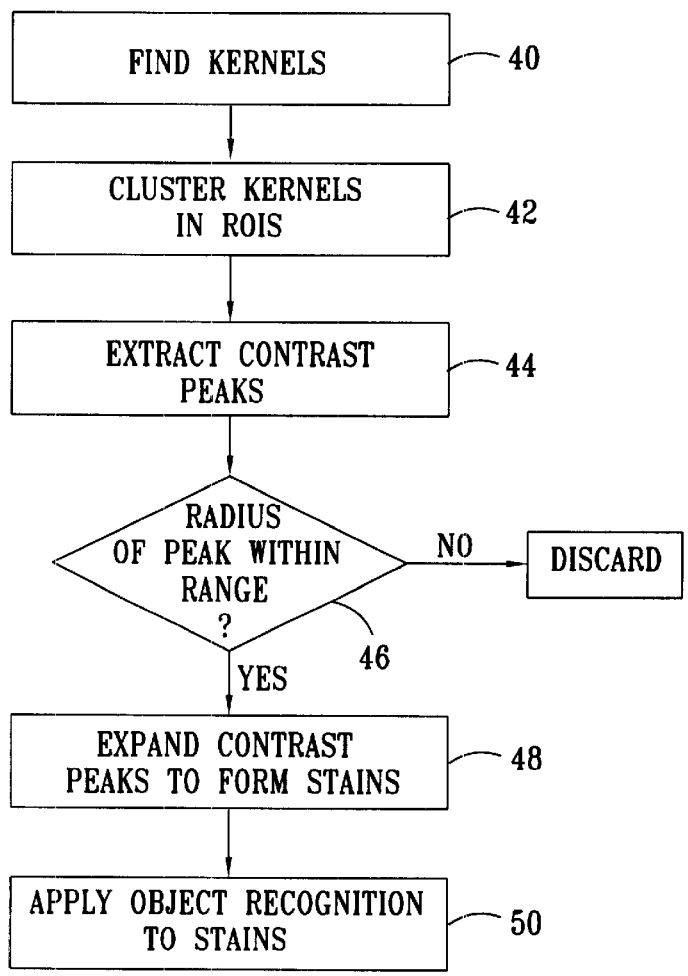
FIG. 2 is a flow chart that schematically illustrates a method for identifying an object in an image, in accordance with a preferred embodiment of the present invention.

FIG. 2 is a flow chart that schematically illustrates a method for finding an object in an image, in accordance with a preferred embodiment of the present invention. The method is particularly applicable to finding objects such as label 24 on parcel 22. Although for the sake of clarity, the method is described below with reference to finding a single object in the image, it may be extended in a straightforward manner to finding multiple objects simultaneously or in sequence.

At a kernel finding step 40, a small subset of the pixels in the overall image are scanned to find pixels that lie on image features having a width within a predefined range. The range that is chosen for this purpose depends on the widths of the actual lines in the object that is to be found. These pixels are termed kernels. At a clustering step 42, the kernels are grouped into clusters, using any suitable clustering algorithm known in the art. For example, the image may be divided into tiles. The number of kernels in each tile are counted, and those tiles having a number of kernels above a given threshold are identified as belonging to regions of interest (ROIs).

Figure 3:
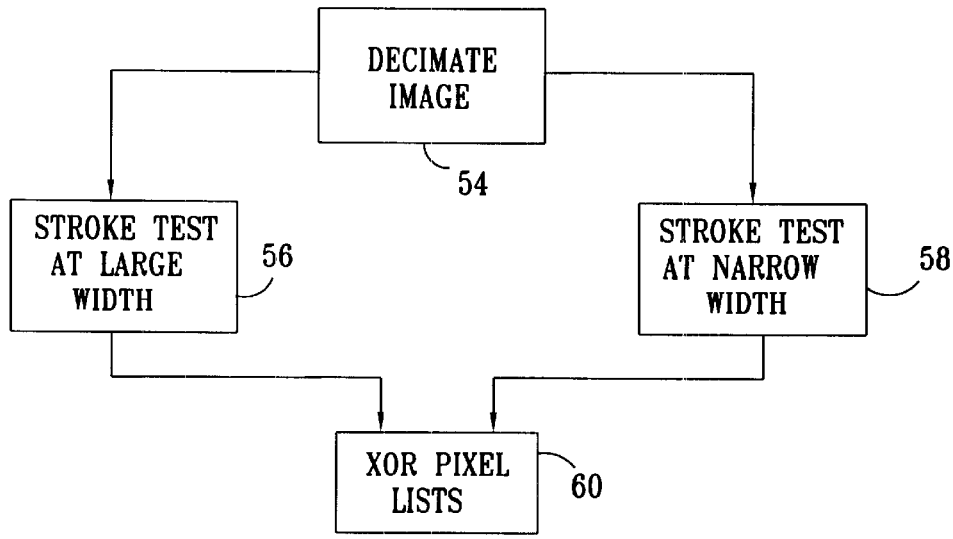
FIG. 3 is a flow chart that schematically illustrates a method for finding regions of interest in an image, useful particularly in the context of the object identification method of FIG. 2, in accordance with a preferred embodiment of the present invention.

FIG. 3 is a flow chart that schematically illustrates details of kernel finding step 40, in accordance with a preferred embodiment of the present invention. At a decimation step 54, the original image is decimated by a factor D in both horizontal and vertical directions, thus generating a subsampled image containing only the pixels having (x,y) coordinates given by (nD,mD), wherein n and m are integers. The number of pixels to be scanned at this stage is thus reduced by $D^2$ relative to the original image.

For the object that is being sought in the image, a range of stroke widths is defined, such that the lines that make up the object in the image are highly likely to have stroke widths within this range. The range is delimited by a maximum width $w_1$ and a minimum width $w_2$. At a maximum width testing step 56, the gray-scale values P(x,y) of the pixels in the decimated image are evaluated to determine whether they satisfy the following composite condition:

P(x,y)<T
  AND
{
  [P(x-$w_1$,y)-P(x,y)]>t AND [P(x+$w_1$,y)-P(x,y)]>t
    OR
  [P(x,y-$w_1$)-P(x,y)]>t AND [P(x,y+$w_1$)-P(x,y)]>t
    OR
  [P(x+$d_1$,y+$d_1$)-P(x,y)]>t AND [P(x-$d_1$,y-$d_1$)-P(x,y)]>t
    OR
  [P(x+$d_1$,y-$d_1$)-P(x,y)]>t AND [P(x-$d_1$,y+$d_1$)-P(x,y)]>t
}

In these equations, T is a gray-level threshold, while t is a contrast threshold, both of which are determined based on the characteristics of the image and the object of interest. The parameter $d_1$ is equal to $w_1/\sqrt{2}$. The inequality P(x,y)<T tests whether the gray-scale value of the pixel is darker than the threshold T. The remaining inequalities test whether the gray-scale contrast between the pixel (x,y) and two points at the opposite sides of a circle of diameter $w_1$ centered on the pixel is greater than t. While pixels (x,y) are taken from the decimated image, the points on the circle may be taken from the original, non-decimated image.

Pixels satisfying the above condition are marked "ON" at step 56, indicating that they may lie on a line of width less than the maximum stroke width $w_1$. At a minimum width testing step 58, the same procedure is repeated for the pixels marked "ON" at step 56, this time using the minimum stroke width $w_2$ (and a corresponding parameter $d_2$). Thus, in this step, pixels that may lie on a line of width less than the minimum stroke width are marked "ON." At a XOR step 60, the disjunction (exclusive OR) of the pixels marked "ON" in steps 56 and 58 is taken. The disjunction returns a list of pixels that may lie on lines whose width is between the maximum and minimum stroke widths. The list is input to step 42 for the purpose of finding the ROIs.

U.S. patent application Ser. No. 09/310,287, filed May 12, 1999, which is assigned to the assignee of the present patent application, and whose disclosure is incorporated herein by reference, describes an algorithm similar to that carried out at step 56 in FIG. 3. In that application, lines whose width is less than a predetermined maximum are identified in an image for the purpose of finding text pixels, in order to optimally binarize the image in preparation for performing optical character recognition. There is no provision made in that application, however, for eliminating lines whose width is below a smaller, minimum width.

Figure 4:
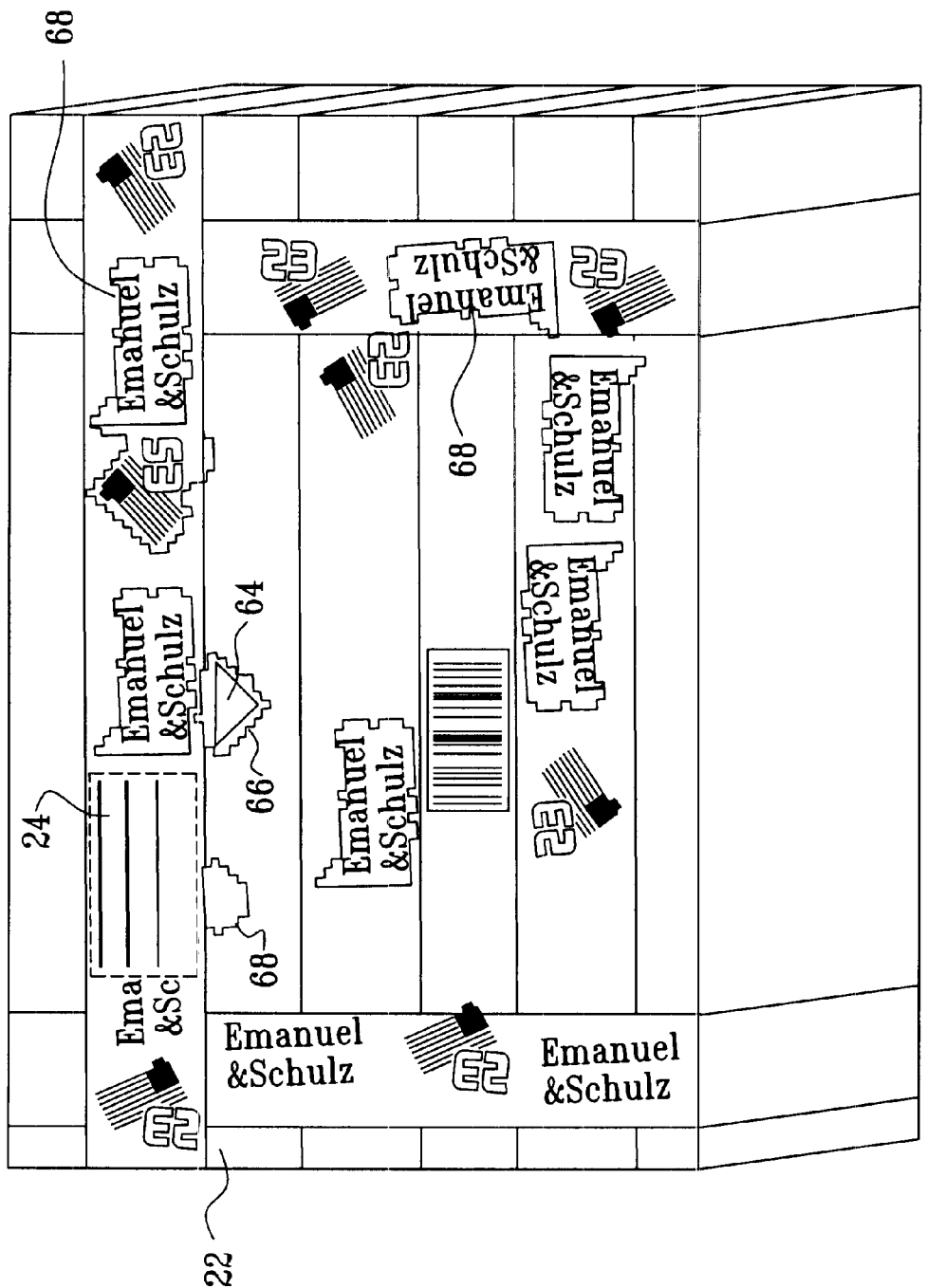
FIG. 4 is a reproduction of an image captured in the system of FIG. 1, in which regions of interest have been identified using the methods of FIGS. 2 and 3.

FIG. 4 is a reproduction of an image of parcel 22 captured in system 20, showing ROIs 66 and 68 found at step 42, in accordance with a preferred embodiment of the present invention. In this example, the object being sought in the image is a triangular postal sticker 64, which is contained in ROI 66. The maximum and minimum widths used in step 40 are defined based on the width of the black borderlines that form the sides of the triangle. The other ROIs 68 found at this stage also contain lines whose width is on the order of the borderlines of sticker 64.

Returning now to FIG. 2, at a contrast peak extraction step 44, the gray-scale values in each ROI are scanned along a set of selected scan lines passing through the ROI. The scan lines may be horizontal, vertical or diagonal. Although a single scan line per ROI may be sufficient, it is preferable to use two or three scan lines per ROI in order to make the search more robust. Most preferably, the relative orientations and spacing between the scan lines are chosen based on the size and shape of the object being sought. In any case, the scan lines include only a small fraction of all of the pixels in the ROI.

Figure 5:
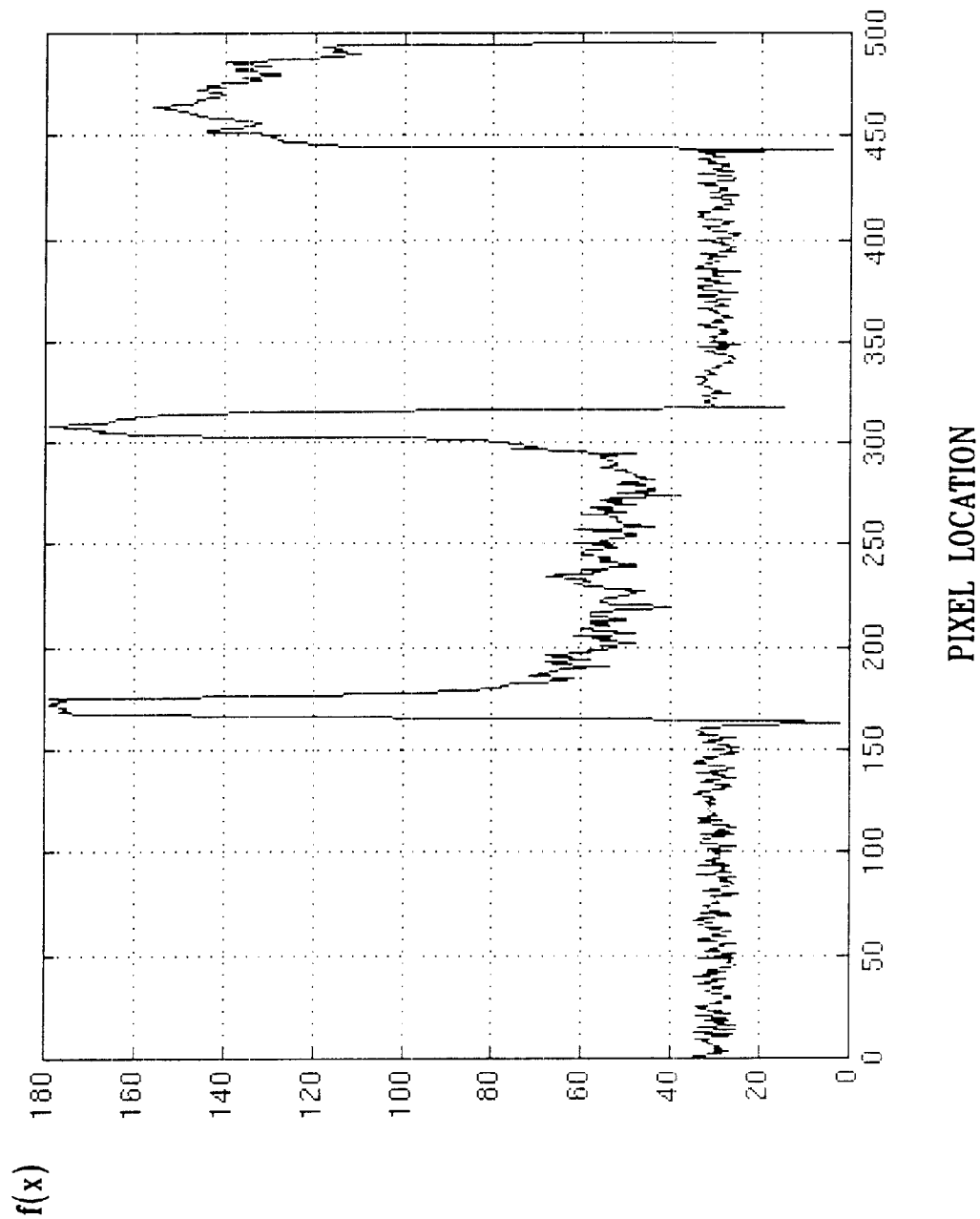
FIG. 5 is a plot of gray-scale value as a function of pixel location taken along a line through one of the regions of interest in FIG. 4.

FIG. 5 is a plot of gray-scale pixel values f(x) along one of the scan lines passing through ROI 66. In this figure and in the description that follows, the gray-scale values are reversed, so that 255 represents black, and 0 represents white. The peaks in the plot correspond to strong contrast variations, which are encountered, inter alia, in the areas in which the scan line crosses one of the dark borderlines of triangular sticker 64. In order to evaluate the widths and magnitudes of these peaks, a difference function d(x) is defined as:

$$d(x)=f(x)-f(x-L)$$

wherein L is half the expected stroke width of the line in the object being sought.

Figure 6:
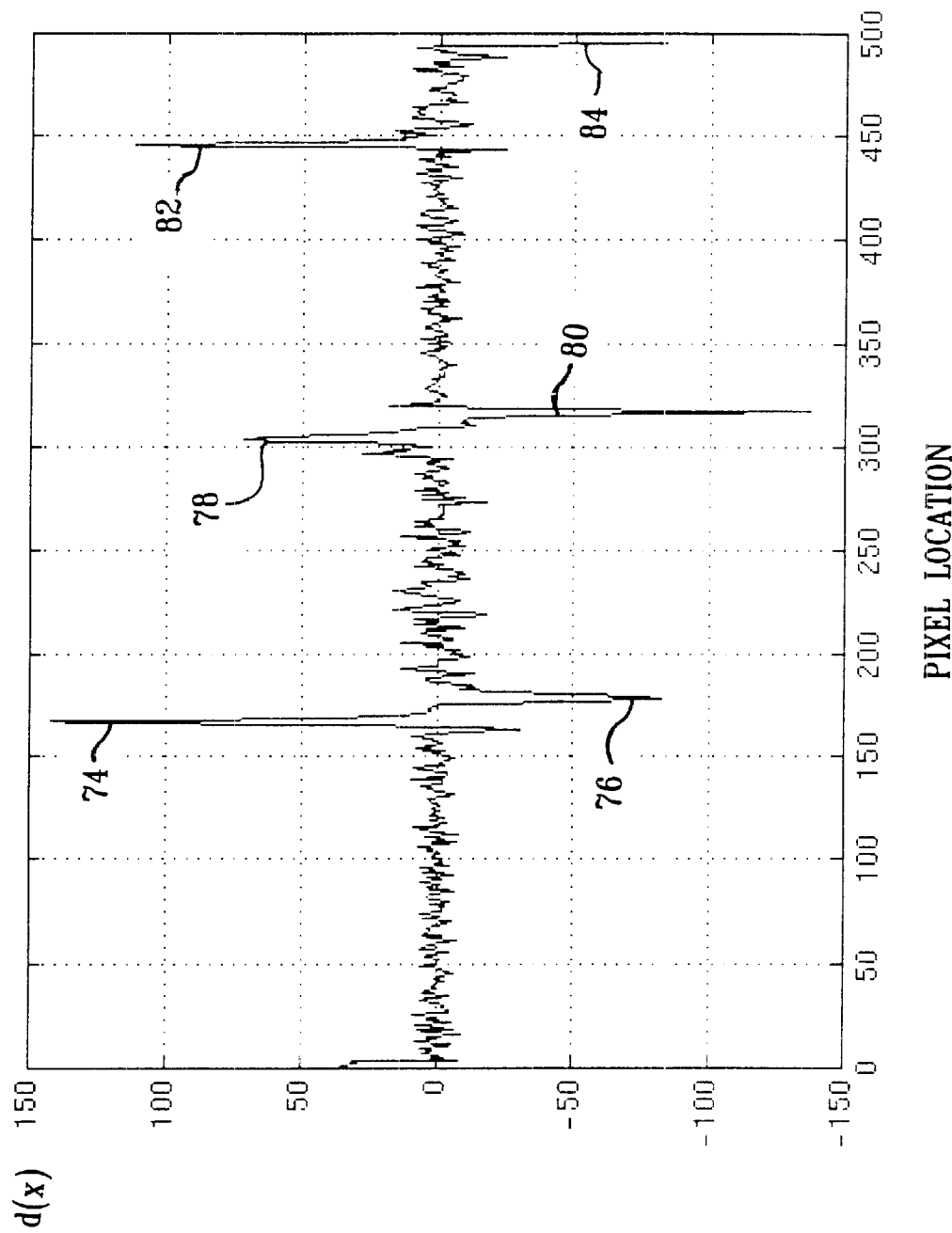
FIG. 6 is a plot of a differential function derived from the gray-scale values of FIG. 5, in accordance with a preferred embodiment of the present invention.

FIG. 6 is a plot of the difference function d(x) derived from the pixel values f(x) in FIG. 5. A contrast peak (CP) in the image is defined by the appearance of a doublet of positive and negative peaks in d(x), such as peaks 74 and 76. To qualify as a CP, the amplitudes of the positive and negative peaks must exceed respective, predetermined thresholds, and the separation between the peaks must be within the predetermined maximum and minimum width limits for the lines in the object. Based on this separation criterion, peaks 74 and 76 can represent one CP, and peaks 78 and 80 can represent another; but peaks 82 and 84 are too far apart to represent a CP and are therefore discarded.

With regard to the amplitude thresholds, it is observed that peaks 76 and 78 are relatively weaker than peaks 74 and 80. Peaks 76 and 78 represent transitions between the borderlines of the triangle in sticker 64 and the dark gray area inside the triangle. These transitions are characterized by lower contrast than the transitions between the borderlines and the light gray area outside the triangle, represented by peaks 74 and 80. In order to deal with this difference, the threshold applied to inner peaks 76 and 78 is preferably set to a lower value than the threshold for outer peaks 74 and 80. The contrast characteristics expressed by these thresholds, which are based on foreknowledge of the object being sought, will pertain regardless of the orientation of the object in the image, and regardless of whether the scan line is analyzed from left to right or right to left. Any CP that meets the contrast and peak separation criteria is marked at step 44 as a candidate CP. The position of the CP is marked as the pixel at the center of the doublet of corresponding positive and negative peaks.

At a radius testing step 46, a radius is computed for each of the CPs found at step 44. The radius is defined as the distance from the CP to the nearest "white" pixel. A white pixel for this purpose is defined as one whose gray-scale value is lighter than that of the pixel at the center of the CP by more than a predetermined threshold. Whereas in step 44, contrast was measured only along the scan lines, in step 46 it is measured in all directions around the CP center pixel. If the distance from the center pixel to the nearest white pixel is either less than or greater than the predefined limits of the width range, the corresponding CP is discarded. Only CPs meeting the radius criterion are passed to a stain formation step 48, at which these CPs undergo an expansion operation in order to reconstruct the objects in the ROIs.

Figure 7:
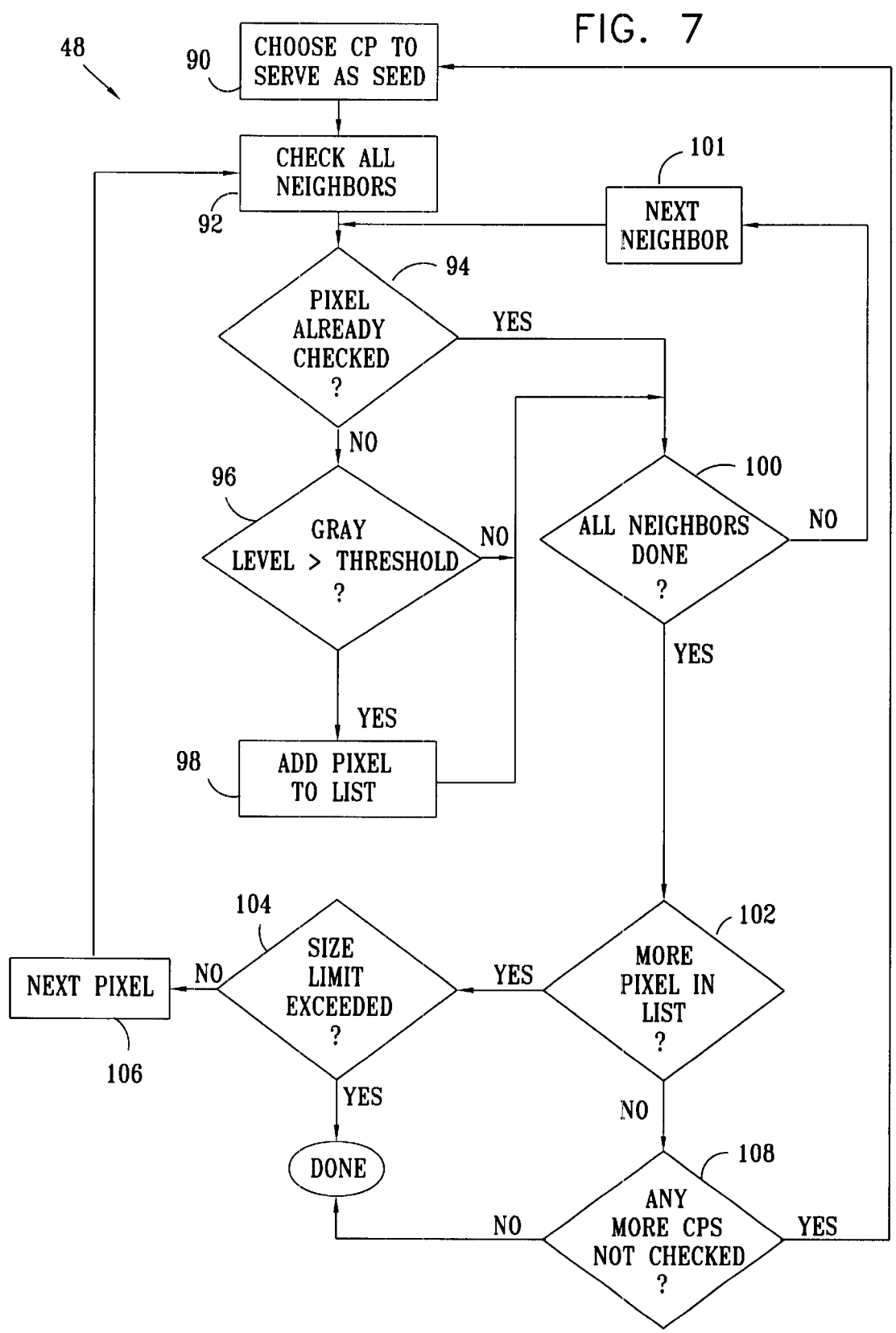
FIG. 7 is a flow chart that schematically illustrates a method of region growing, useful particularly in the context of the object identification method of FIG. 2, in accordance with a preferred embodiment of the present invention.

FIG. 7 is a flow chart that schematically illustrates details of stain formation step 48, in accordance with a preferred embodiment of the present invention. For each of the ROIs, one of the CPs found in the ROI is chosen to serve as a seed for expansion into a stain, in a seed selection step 90. A contrast threshold is also chosen at this point, which is applied in determine which other pixels in the ROI should be added to a list of pixels belonging to the stain, as described below. Preferably, the threshold is chosen based on the gray-scale value of the seed, for example, as a predetermined fraction of the seed gray-scale value (wherein black= 255) or as a function of the contrast in the image between the seed and nearby background pixels. In this manner, the subsequent stain expansion steps are adapted for contrast and/or brightness variations that may occur in different parts of the image. Most preferably, if there are multiple CPs in the ROI, the brightest CP is chosen initially to be the seed. The relatively low threshold that will be chosen for this bright CP will also pick up the darker CPs in the ROI that belong the same stain.

To begin expansion of the stain, a pointer is initialized to point to the first pixel on the list of pixels in the stain, i.e., to the seed itself (at this point the only pixel on the list). At a neighbor checking step 92, all of the neighbors of the pixel that is currently indicated by the pointer are examined. For each of the neighbors, it is first determined whether this neighbor has already been considered for inclusion in the stain, at a pixel checking step 94. If not, the gray-scale value of the neighbor is checked, at a gray-scale checking step 96, to determine whether it is darker than the threshold determined at step 90. If so, the pixel is added to the list of pixels in the stain, at a pixel addition step 98. At a neighborhood completion step 100, it is determined whether there are any further neighbors of the seed to be checked, and if so, the next neighbor is selected, at a next neighbor step 101. Steps 94 through 101 are repeated until all of the neighbors of the pixel currently indicated by the pointer have been examined.

When all of the neighbors of the current pixel have been examined, the current list of pixels in the stain is inspected at a list checking step 102, to determine whether there are any further pixels on the list whose neighbors have not been checked. If there are further pixels on the list, the current size of the stain is checked at a size monitoring step 104, in order to make sure that the stain has not already exceeded a predetermined size limit. This limit is given by the size of the object being sought in the image. The stain expansion is terminated if the size of the stain exceeds the size limit, in order to avoid wasting processing time on a stain that cannot correspond to the object. As long as the size limit is not exceeded, however, the pointer is incremented to the next pixel on the list, at a next pixel step 106, and the preceding steps are repeated.

When it is found at step 102 that the process has reached the bottom of the list, any remaining CPs in the current ROI are checked, at a CP checking step 108, to determine whether there are any of them that were not included in the existing list. If so, one of these CPs is chosen as a new seed, at step 90, and the entire process is repeated. Preferably, if multiple different objects are being sought in the image simultaneously, the CPs that may correspond to the largest of the objects are expanded first. These CPs will have a larger size limit at step 104, and the resultant large stains may subsume smaller stains that would be generated by expanding CPs believed to correspond to smaller objects, thus reducing the total processing time required to complete the ROI.

FIG. 8 is a reproduction of a binary image of stains generated by applying steps 44, 46 and 48 (FIG. 2) to ROIs 66 and 68 identified in the image of FIG. 4. To generate these stains, contrast peaks were first found in the ROIs at step 44 using scan lines spaced by half the height of triangle 64. The dark borderlines of the triangle are clearly identified in the corresponding stain. Other stains 110 and 112, which happen to include lines whose width is similar to that of the triangle borderlines, are also generated.

Finally, at an object recognition step 50, shown in FIG. 2, the stain images are analyzed to identify the object of interest and its position in the overall image. Various image recognition algorithms, as are known in the art, may be applied at this step, using either the binary stain images alone or the corresponding gray-scale information in the original image. The optimal choice of algorithm at this stage depends on the specific characteristics of the object and is beyond the scope of the present invention. It will be apparent, however, that the time required to carry out this algorithm will be substantially reduced, and the reliability of object identification substantially enhanced, relative to methods of image processing known in the art in which the object recognition algorithm must be applied over the entire image.

Although the preferred embodiment described above relates to processing of a gray-scale image of a certain type, it will be understood that the principles of the present invention may be adapted in a straightforward manner to process images of substantially any type, including color images. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for finding a predefined object in an image, comprising:

selecting a line belonging to the object, the line having a known stroke width;

defining a maximum width and a minimum width that together define a range of widths therebetween that contains the stroke width;

finding a feature in the image having a feature width within the range; and processing the feature to determine whether it is a part of the object, wherein finding the feature in the image comprises:

finding a first locus of pixels in the image belonging to one or more elements of the image having a width less than the maximum width;

finding a second locus of pixels in the image belonging to one or more elements of the image having a width less than the minimum width; and taking a disjunction of the first and second loci.

2. A method according to claim 1, wherein finding the first locus comprises finding a pixel having a gray-scale value that differs by at least a predetermined contrast threshold from the gray-scale values of other pixels at a distance therefrom that is equal to the maximum width.

3. A method according to claim 1, wherein finding the feature in the image comprises sub-sampling the image before finding the loci, so that only a subset of all of the pixels in the image are considered for inclusion in the loci.

4. A method according to claim 1, wherein finding the feature in the image comprises identifying a cluster of the pixels in the disjunction of the first and second loci as a region of interest in the image, which region is a candidate to contain the object.

5. A method according to claim 1, wherein the object comprises one or more markings on an item, according to which the item is to be sorted by a sorting system, and wherein processing the feature comprises identifying the markings, and comprising sorting the item responsive to the identified markings.

6. A method for finding a predefined object in an image, comprising:

selecting a line belonging to the object, the line having a known stroke width;

defining a maximum width and a minimum width that together define a range of widths therebetween that contains the stroke width;

finding a feature in the image having a feature width within the range; and processing the feature to determine whether it is a part of the object, wherein finding the feature in the image comprises:

identifying a region of interest in the image, which is a candidate to contain the object; selecting a scan line passing through the region of interest; and evaluating gray-scale values of pixels disposed along the scan line so as to find a pair of contrast transitions that are separated from one another by a distance that is within the range.

7. A method according to claim 6, wherein selecting the scan line comprises selecting a plurality of scan lines, having a spacing therebetween determined responsive to a dimension of the object.

8. A method according to claim 6, wherein evaluating the gray-scale values comprises finding the contrast transitions such that a difference between the respective gray-scale values of a selected pair of the pixels on the scan line, one on either side of any given one of the transitions, exceeds a predetermined threshold.

9. A method according to claim 8, wherein the pair of the pixels are separated from one another by a distance that is selected as a function of the stroke width.

10. A method according to claim 6, wherein the object comprises one or more markings on an item, according to which the item is to be sorted by a sorting system, and wherein processing the feature comprises identifying the markings, and comprising sorting the item responsive to the identified markings.

11. A method for finding a predefined object in an image, comprising:

selecting a line belonging to the object, the line having a known stroke width;

defining a maximum width and a minimum width that together define a range of widths therebetween that contains the stroke width;

finding a feature in the image having a feature width within the range; and processing the feature to determine whether it is a part of the object, wherein processing the feature comprises:

finding a locus of at least one initial pixel belonging to the feature; and expanding the locus to reconstruct the line in the object.

12. A method according to claim 11, wherein expanding the locus comprises adding to the locus an additional pixel that is adjacent to the at least one initial pixel and has a gray-scale value beyond a threshold that is set responsive to a gray-scale value of the at least one initial pixel.

13. A method according to claim 12, wherein adding the additional pixel to the locus comprises adding a first additional pixel, and wherein expanding the locus further comprises:

continuing to add further additional pixels that are adjacent to the pixels in the locus and have respective gray-scale values beyond the threshold; and stopping to add the further additional pixels when the locus reaches a maximum size determined responsive to a dimension of the object.

14. A method according to claim 11, wherein processing the feature comprises processing the expanded locus so as to match the locus to the object.

15. A method according to claim 11, wherein the object comprises one or more markings on an item, according to which the item is to be sorted by a sorting system, and wherein processing the feature comprises identifying the markings, and comprising sorting the item responsive to the identified markings.

16. Apparatus for finding a predefined object in an image, comprising an image processor operative to find a feature in the image having a feature width that is within a range between a predefined maximum width and minimum width, the range being defined so that a known stroke width of a line belonging to the object falls within the range, and further operative to process the feature to determine whether it is a part of the object, wherein the image processor is arranged to find the feature by finding a first locus of pixels in the image belonging to one or more elements of the image having a width less than the maximum width, finding a second locus of pixels in the image belonging to one or more elements of the image having a width less than the minimum width, and taking a disjunction of the first and second loci.

17. Apparatus according to claim 16, and comprising an image capture device, configured to capture the image including the object and to convey an electronic representation of the image to the image processor.

18. Apparatus according to claim 17, wherein the object comprises one or more markings on an item, according to which the item is to be sorted, and wherein the apparatus is adapted to read the markings and to sort the item responsive thereto.

19. A computer software product for finding a predefined object in an image, comprising a computer-readable medium in which program instructions are stored, which instructions, when read by a computer, cause the computer to find a feature in the image having a feature width that is within a range between a predefined maximum width and minimum width, the range being defined so that a known stroke width of a line belonging to the object falls within the range, and further cause the computer to process the feature to determine whether it is a part of the object, wherein the instructions cause the computer to find the feature by finding a first locus of pixels in the image belonging to one or more elements of the image having a width less than the maximum width, finding a second locus of pixels in the image belonging to one or more elements of the image having a width less than the minimum width, and taking a disjunction of the first and second loci.

20. Apparatus for finding a predefined object in an image, comprising an image processor operative to find a feature in the image having a feature width that is within a range between a predefined maximum width and minimum width, the range being defined so that a known stroke width of a line belonging to the object falls within the range, and further operative to process the feature to determine whether it is a part of the object, wherein the image processor is arranged to find the feature by identifying a region of interest in the image, which is a candidate to contain the object, selecting a scan line passing through the region of interest, and evaluating gray-scale values of pixels disposed along the scan line so as to find a pair of contrast transitions that are separated from one another by a distance that is within the range.

21. Apparatus for finding a predefined object in an image, comprising an image processor operative to find a feature in the image having a feature width that is within a range between a predefined maximum width and minimum width, the range being defined so that a known stroke width of a line belonging to the object falls within the range, and further operative to process the feature to determine whether it is a part of the object, wherein the image processor is arranged to process the feature by finding a locus of at least one initial pixel belonging to the feature, and expanding the locus to reconstruct the line in the object.

22. A computer software product for finding a predefined object in an image, comprising a computer-readable medium in which program instructions are stored, which instructions, when read by a computer, cause the computer to find a feature in the image having a feature width that is within a range between a predefined maximum width and minimum width, the range being defined so that a known stroke width of a line belonging to the object falls within the range, and further cause the computer to process the feature to determine whether it is a part of the object, wherein the instructions cause the computer to find the feature by identifying a region of interest in the image, which is a candidate to contain the object, selecting a scan line passing through the region of interest, and evaluating gray-scale values of pixels disposed along the scan line so as to find a pair of contrast transitions that are separated from one another by a distance that is within the range.

23. A computer software product for finding a predefined object in an image, comprising a computer-readable medium in which program instructions are stored, which instructions, when read by a computer, cause the computer to find a feature in the image having a feature width that is within a range between a predefined maximum width and minimum width, the range being defined so that a known stroke width of a line belonging to the object falls within the range, and further cause the computer to process the feature to determine whether it is a part of the object, wherein the instructions cause the computer to process the feature by finding a locus of at least one initial pixel belonging to the feature, and expanding the locus to reconstruct the line in the object.

* * * * *